United States Patent
Huston et al.

(10) Patent No.: US 6,211,526 B1
(45) Date of Patent: Apr. 3, 2001

(54) MARKING OF MATERIALS USING LUMINESCENT AND OPTICALLY STIMULABLE GLASSES

(75) Inventors: Alan L. Huston; Brian L. Justus, both of Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/163,332

(22) Filed: Sep. 30, 1998

(51) Int. Cl.[7] ................................................. G03C 5/16
(52) U.S. Cl. ................................. 250/484.4; 250/484.3; 250/330
(58) Field of Search ............................... 250/484.4, 330, 250/484.3, 271, 458.1, 459.1, 461.1

(56) References Cited

U.S. PATENT DOCUMENTS

| | | | |
|---|---|---|---|
| 4,830,875 | * 5/1989 | Lindmayer | 250/484.4 |
| 5,144,145 | * 9/1992 | Jutamulia et al. | 250/330 |
| 5,321,270 | * 6/1994 | Jutamulia et al. | 250/484.4 |
| 5,324,635 | * 6/1994 | Kawase et al. | 250/459.1 |
| 5,585,640 | * 12/1996 | Huston et al. | 250/484.4 |
| 5,811,822 | 9/1998 | Huston et al. | 250/484.4 |
| 5,847,400 | * 12/1998 | Kain et al. | 250/461.1 |
| 5,876,672 | * 3/1999 | Dandliker et al. | 250/458.1 |
| 5,877,504 | * 3/1999 | Yanagita et al. | 250/484.4 |
| 5,991,030 | * 11/1999 | Yamamoto et al. | 250/458.1 |
| 6,028,977 | * 2/2000 | Newsome | 250/484.4 |

* cited by examiner

*Primary Examiner*—Constantine Hannaher
*Assistant Examiner*—Otilia Gabor
(74) *Attorney, Agent, or Firm*—John J. Karasek; Philip E. Ketner

(57) ABSTRACT

Objects are marked for identification by a luminescent label including an optically stimulable glass having trapping centers and luminescence centers. The objects are marked by exposing the luminescent label to a radiation flux to populate metastable trapping centers in the luminescent label. The labels are read by exposing the label to a second radiation flux of optical radiation, to stimulate the release of trapped charges, causing the label to luminesce. The labels may also be read without previously populating these metastable trapping centers, by stimulating prompt luminescence through exposure to a flux of UV radiation. The label is made from an optically stimulable glass, where this glass has a glass matrix with defects, where these defects may be: (i) an alkaline earth sulfide, activator Sm ions, and an additional coactivator dopant (Eu or Ce); (ii) ZnS and activator ions (Cu, Pb, Mn, Ce, Eu, Ag, Au, or Fe); or (iii) activator ions without metal sulfides.

31 Claims, 6 Drawing Sheets

MARKING OF MATERIALS USING LUMINESCENT AND OPTICALLY STIMULABLE GLASSES

BACKGROUND OF THE INVENTION

1. Field of the Invention

The present invention relates generally to invisibly marking articles and materials for a dual mode readout, using luminescent and optically stimulable glasses. More particularly, the invention relates to using metal ion dopants in a glassy matrix in inks, dyes, and the like, for marking articles and materials, and for detecting these materials by fluorescence and optically stimulated readout of trapped states. Particular aspects of the invention include luminescent doped glasses, including copper-, europium-, and cerium-doped glasses such as Vycor™ (a registered trademark of Corning Corporation, Corning, N.Y.) and fused quartz.

2. Description of the Related Art

Labels that are not apparent to the naked eye are desired for many manufactured articles and materials. It is also desired to make such labels as flexible in applicability and as robust as possible. For instance, it is desirable to make labels that can be applied with dyes, inks, stains, shellacs, varnishes, glazes, polymer coatings such as polyurethane coatings, and other coatings or materials for application to an article. It is also desirable to make such labels robust so that, for instance, they can survive exposure to moderately high temperatures and exposure to common solvents. It is also desired to make labels that are non-toxic.

It is also desired to make labels that have some type of redundancy built into them. That is, it is desired to make labels that can be read in more than one way, as a double check on the authenticity of a labeled article.

Since labels generally require some type of coding (bar coding, alphanumeric coding, etc.), it is desired to have such coding on a label that is likewise not visible to the naked eye. In practice today, this is often done by putting a "hidden" number such as a serial number in some out of the way place in an article, such as inside a case or housing. The difficulty is that such placement is almost inherently not readily accessible, and so it is difficult to get to when it is desired to read the label. It would be preferred to have coding that is hidden in plain sight. Coding that requires stimulation for readability would satisfy this need.

It is often desirable to have a way of monitoring some time relating to labeled articles, such as shipping time or shelf time. A label that included some type of timing capability would satisfy this need. Optimally, such a timing system would have a broad range, being able to time over scales of days, weeks, months, or years, as needed.

Materials used for detecting infrared light by stimulating upconverted visible luminescence have been intensively studied for decades. Early work during the 1940's determined that the most efficient materials were polycrystalline alkaline earth sulfides such as SrS or CaS doped with trivalent rare earth activator and coactivator ions such as Sm paired with Ce or Eu. Presently, the most widely used optically stimulable luminescent (OSL) phosphors have evolved very little from the early formulations. These phosphors are typically micron-sized powders or polycrystalline films that absorb ionizing radiation ($\gamma$-ray, x-ray, $\beta$-particle) or UV radiation and store a portion of the absorbed energy in the form of trapped charges. The trapped charges are stable until the phosphor is illuminated with a light source capable of stimulating luminescent electron-hole recombination.

Traditional OSL phosphors are highly scattering to visible light, due to the micron-sized features of the powders or films. The OSL is severely attenuated due to the scattering, thereby not only reducing the brightness of the emission, but also placing a practical limitation on the thickness and functionality of the phosphor for many applications. However, for applications where the phosphor is expected to be very thin, this scattering will be less critical.

The inventors have recently disclosed patents and published papers that describe several types of optically transparent, thermoluminescent, and optically stimulable glasses that operate through a charge trapping mechanism. For the thermoluminescent glasses, luminescent recombination of electron-hole pairs is induced by applying enough heat (by external heating or laser heating) to overcome the thermal barrier to recombination. In the case of an optically stimulable glass, recombination is induced by exposure to a light source with a wavelength that overlaps the optical stimulation band in the OSL material. Optical stimulation has a number of advantages over thermal stimulation, such as little or no bulk heating of the glass and a very rapid readout.

SUMMARY OF THE INVENTION

Accordingly, it is an object of this invention to provide a method for invisibly marking articles and materials.

It is a further object of this invention to provide such marking with dyes and inks.

It is a further object of this invention to provide such marking in a robust manner that is not sensitive to moderate temperatures or common solvents.

It is a further object of this invention to provide such marking with non-toxic materials.

It is a further object of this invention to provide such marking with redundant, dual-mode readout (that is, having two methods for viewing the normally invisible mark).

It is a further object of this invention to provide such marking with invisible coding, such as bar-coding, alpha-numeric coding, other symbols, or graphic images.

It is a further object of this invention to provide such marking with the ability to monitor transit or shelf time, or some other time relating to that article that may span days, weeks, months, or years.

It is a further object of this invention to provide such marking with a method of distinguishing the marking from conventional fluorescent dye marking, by the time scale of the fadeout of phosphorescence.

It is a further object of this invention to provide such marking with a transparent, non-scattering label.

It is a further object of this invention to provide such marking with a material that is not widely available commercially, and therefore not easily duplicated, especially in comparison to conventional fluorescent dyes.

It is a further object of this invention to provide such marking with a material that undergoes optically stimulated luminescence.

These and additional objects of the invention are accomplished by the structures and processes hereinafter described.

An aspect of the present invention is a material that contains, as a component, a glass matrix with luminescent centers and trapping centers. The trapping centers are capable of storing charges (electrons or holes) for extended periods of time. The trapped charges may be stimulated to recombine by the application of optical energy, resulting in the emission of light energy. In several embodiments, the present invention includes a glass (e.g., porous glass such as Vycor™, fused quartz, fused silica, alumina glass, or borate glass) matrix including an alkaline earth sulfide doped with an activator/co-activator pair of samarium and another rare earth element, typically europium or cerium. In other alternative embodiments, the glass matrix includes ZnS doped with copper, lead, manganese, or cerium. In yet another embodiment, the glass matrix is doped with Cu, Ag, Eu, or Ce. This doped glass will luminesce under excitation by an appropriate light source (typically a UV source). In other alternative embodiments, the glass matrix has other defects that provide luminescence centers, such as crystalline defects, gaps, etc.

Unlike the fluorescent luminescence of conventional fluorescent dyes, this luminescence includes a phosphorescent component that does not fade out for several seconds after the excitation source is removed. This combination of a prompt fluorescence with a lifetime of microseconds and a phosphorescence that decays over a period of tens of seconds to minutes may be used as a "fingerprint" to distinguish these materials from conventional fluorescent dyes. Moreover, if previously exposed to an excitation source that populates trap centers, this glass will release trapped charges upon optical stimulation. The released charges will recombine and emit photons. Because of this optically stimulated luminescence, this doped glass is referred to herein as OSL glass, to distinguish it from other fluorescent materials.

The labeled material may be fabric, paper, plastic, glass, or any other material that may incorporate the doped glass matrix. The marking material may be an ink, a dye, a shellac, a varnish, a glaze, a stain, or some other coating or material that contains incorporated within it the optically stimulable phosphor, for application to an article.

Another aspect of the invention is a method and apparatus for invisibly marking an article or material. The method of the invention has the steps of incorporating the OSL glass into the article or material to be marked, and activating the OSL glass by populating trap centers in the glass, typically with UV light.

Another aspect of the invention is a method and apparatus for visualizing the label of an invisibly marked article or material. The method of the invention has the steps of stimulating the optical luminescence of the invisibly marked and activated material, typically by IR or near-IR stimulation. Optionally, this method includes the additional step of stimulating a fluorescence readout, typically by UV stimulation.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Figure 1:
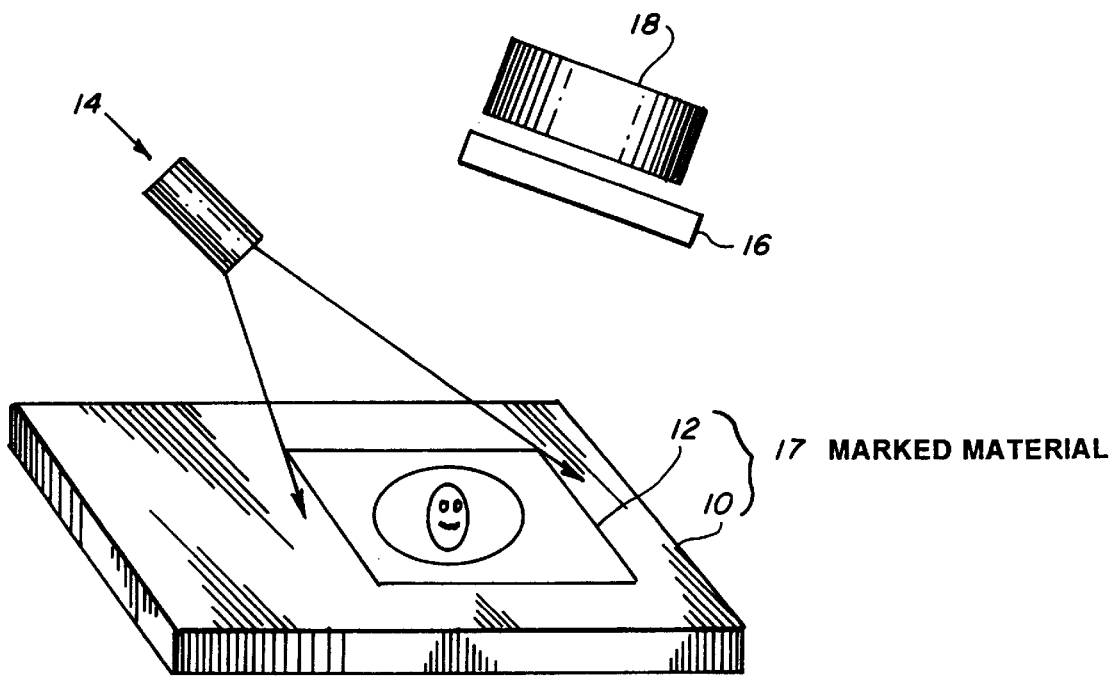
FIG. 1 is a schematic representation of an ultraviolet excitation system and visible light readout system according to the invention.

The following are incorporated by reference herein, in their entireties, and for all purposes:
  (a) U.S. Pat. No. 5,585,640, issued Dec. 17, 1996 to Huston et al.; and
  (b) U.S. patent application Ser. No. 08/848,259, filed Apr. 29, 1997 by Huston et al., allowed, issue fee paid.

The glasses and additives useful for this invention are described in co-pending application Ser. No. 08/848,259. The particular glasses and additives selected will depend on the properties desired, such as (1) the color of the prompt luminescence or the optically stimulated luminescence, (2) the desired trap lifetime, or desired combination of lifetimes, and (3) the desired physical properties of the glass, such as porosity, and the associated diffusivity.

A typical embodiment of the invention uses a glass containing an alkaline earth sulfide doped with an activator/co-activator pair of rare earth elements. Typical alkaline earth sulfides according to the present invention include MgS, CaS, SrS, and BaS. In this embodiment, one of the rare earths is samarium, and the other rare earth is europium, cerium, or a combination thereof. Suitable glasses for this embodiment of the invention include porous Vycor™ glass, fused quartz, fused silica, alumina glass, or borate glass.

Another embodiment of the invention uses a glass matrix (e.g., silica, alumina, or borate glass) doped with ZnS and copper, lead, manganese, or cerium.

In yet another embodiment, the glass (e.g., silica, alumina, or borate glass) matrix is doped with Cu, Ce, Ag, or Eu. In this embodiment, the glass may be essentially free of metal sulfides or sulfides. As used herein, "essentially free" means there is not enough of a component to measurably or visibly affect the optical stimulation or luminescence properties of the glass.

Table 1 summarizes the properties of several glasses according to the present invention:

TABLE 1

| Glass | luminescence color on stimulation by 254 nm light | luminescence duration ($t_{1/2}$) on stimulation by 254 nm light* | OSL color on stimulation by 790 nm light |
| --- | --- | --- | --- |
| SrS:Sm,Eu in Vycor | mixture of blue & red | 10 sec | same |
| ZnS:Cu in Vycor | blue-green | 30 sec | same |
| Cu in fused quartz | blue-green | 15 sec | same |
| Eu in Vycor | red and blue | 23 sec | same |
| Ce in Vycor | blue | n/a | same |

*The decay is not exponential. The observed half life will be longer if the observer begins the measurement some time after the stimulation is removed.

In each of these embodiments, the OSL glasses typically are prepared by diffusing the dopants (including sulfide components) into the glass matrix. Because the dopants are diffused into the glass matrix, the glass matrix may be either porous or fused (non-porous).

The dopants may be diffused into the glass matrix by a wide variety of methods. For example, if the glass matrix is porous, it may be contacted with a solution of salts of the desired dopant metals for a sufficiently long time to diffuse the salts into the porous glass. Thereafter, the porous glass matrix is dried. In those embodiments that include a metal sulfide component that would be insoluble in the dopant solution used, the dopant solution may contain a soluble salt of the metal portion of the sulfide. After drying, the glass may be sulfided (for example by exposure to gaseous $H_2S$ at elevated temperatures, typically about 100° C.) to provide the desired metal sulfide diffused into the porous glass. The porous glass matrix is then consolidated and activated, for example using any of the consolidation and/or activation methods described in the foregoing Huston et al. patent.

In fused silica or quartz glass, the dopants may be diffused, for example, by dipping the fused silica or quartz glass matrix into an organic-inorganic sol gel (e.g., an organosilicate sol gel) including a salt or salts of the dopant metals. The fused glass matrix is then withdrawn from the sol gel at a slow, steady rate to result in the formation of a porous, thin (typically less than about one micron thick) sol-gel film containing the salt or salts. Upon drying (typically at room temperature to about 200° C.), the organic constituents of the film volatilize and/or decompose, leaving behind a porous, film (a high silica film where an organosilicate sol-gel was used) containing the salts. The glass having the porous film thereon may be sulfided (for example by exposure to gaseous $H_2S$ at elevated temperatures, typically about 100° C.) to provide metal sulfides, if desired. The resulting material is then activated, typically after being placed within a glass (e.g., silica) tube that is then placed within a tube furnace. If sulfiding is not desired, the decomposition and activation steps may be combined, for example, by heating the sol-gel film to a sufficiently high temperature to decompose the organics and diffuse the resulting metal(s) into the glass and activate them. Appropriate conditions for activation are the same as those described for the activation of porous glasses. Of course, the doped fused silica and quartz glasses made according to the present invention do not require consolidation. Porous glass matrices may also be doped using this sol gel method.

The dopant salts used in the solutions and sol gels discussed above are typically selected so that the salt is soluble in the solution or sol gel and the anion component of the salt, upon reduction, forms a gas or mixture of gases that are non-reactive, or beneficially reactive, with the doped glass matrix. The concentrations of these salts in the sol gels and solutions may vary widely. For example, each salt is typically present at a concentration of about 0.001 g per 100 ml solution up to its saturation point at the temperature at which the glass matrix is contacted with the solution or sol gel.

The doped glass matrix provides a mechanically robust, chemically inert phosphor material that is filly compatible with high quality, commercial optical fibers. The material withstands cycling through temperature extremes of up to 1200° C., without any apparent loss in performance. The glass matrix may be doped in bulk form or may be doped in the form of powders or fibers. Also, if desired, a doped bulk glass matrix may be ground into a powder or drawn into fibers. Alternatively, if a powdered glass morphology is desired, the doping can be performed on powdered glass. The doped glass also can be fabricated in the form of flat sheets, rods, tubes and fibers.

Many applications within the scope of the present invention will use powdered OSL glasses, due to their broad usefulness. OSL glass powders with micron scale diameters (such as 325 mesh glasses) have been found to be suitable for use in the present invention.

OSL glass powders may be disposed in some other material. For many applications, OSL glass powders will be included in a polymer, such as polyurethane, polyethylene, polycarbonate, silicone, polymethylmethacrylate (PMMA), acrylic acid, or polyvinyl chloride (PVC). This polymer may then be applied as a coating onto an article. For many applications, it will be desirable to match the indices of refraction of the glass and the polymer, to the greatest practical extent, so that transparency of the material is maintained. Polymers with refractive indices between about 1.4 and 1.5, suitable for the invention, are commercially available.

OSL glass also may be added to inks, stains, shellacs, varnishes, glazes, paints, or dyes (as used in the conventional sense, rather than fluorescent organic dyes). They may be added to synthetic fibers, such as polyester or rayon, for inclusion in fabric articles.

Instead of glass powders, glasses according to the invention may be drawn into fibers, including optical fibers. Likewise, glasses according to the invention may be used in bulk, e.g., as small windows, lenses, or chunks. For instance, a glass label could be incorporated into a transparent article, such as a bottle, a watch crystal, or the like, to aid in identification.

Whatever the morphology of the glass, the methods for exciting the glass for prompt luminescence and for trap formation will be the same in many cases. Referring to FIG. 1, this figure shows the following structure. An article 10 that has been marked with a patterned label 12 including a powdered glass phosphor pattern according to the invention may be illuminated with a UV light source 14. This illumination will excite prompt luminescence and, depending on the wavelength, populate traps. The prompt luminescence typically is filtered through a blue-green color glass filter 16 and detected with a detector 18, such as a CCD camera. The resulting image may be viewed on a computer screen or may be printed directly from the camera unit.

It has been discovered that the effect of UV excitation varies with wavelength. At longer UV wavelengths, e.g., between about 220 nm and 400 nm, very little trapping of charges takes place, although the prompt luminescence response is still observed. Typically, UV excitation at about 254 nm is used to stimulate only prompt luminescence. As the wavelength of stimulating UV light is shortened, however, the charge trapping becomes more efficient, and a greater quantity of charge is trapped in metastable states for subsequent OSL readout. Typically, UV excitation at about 185 nm is used to stimulate both prompt luminescence and trapping for subsequent OSL readout. The particular wavelengths of 185 nm and 254 nm were selected because of the availability of sources in this range (emission lines for mercury). However, other wavelengths in the UV C range (100–280 nm) would be likely to work about as well.

Figure 2:
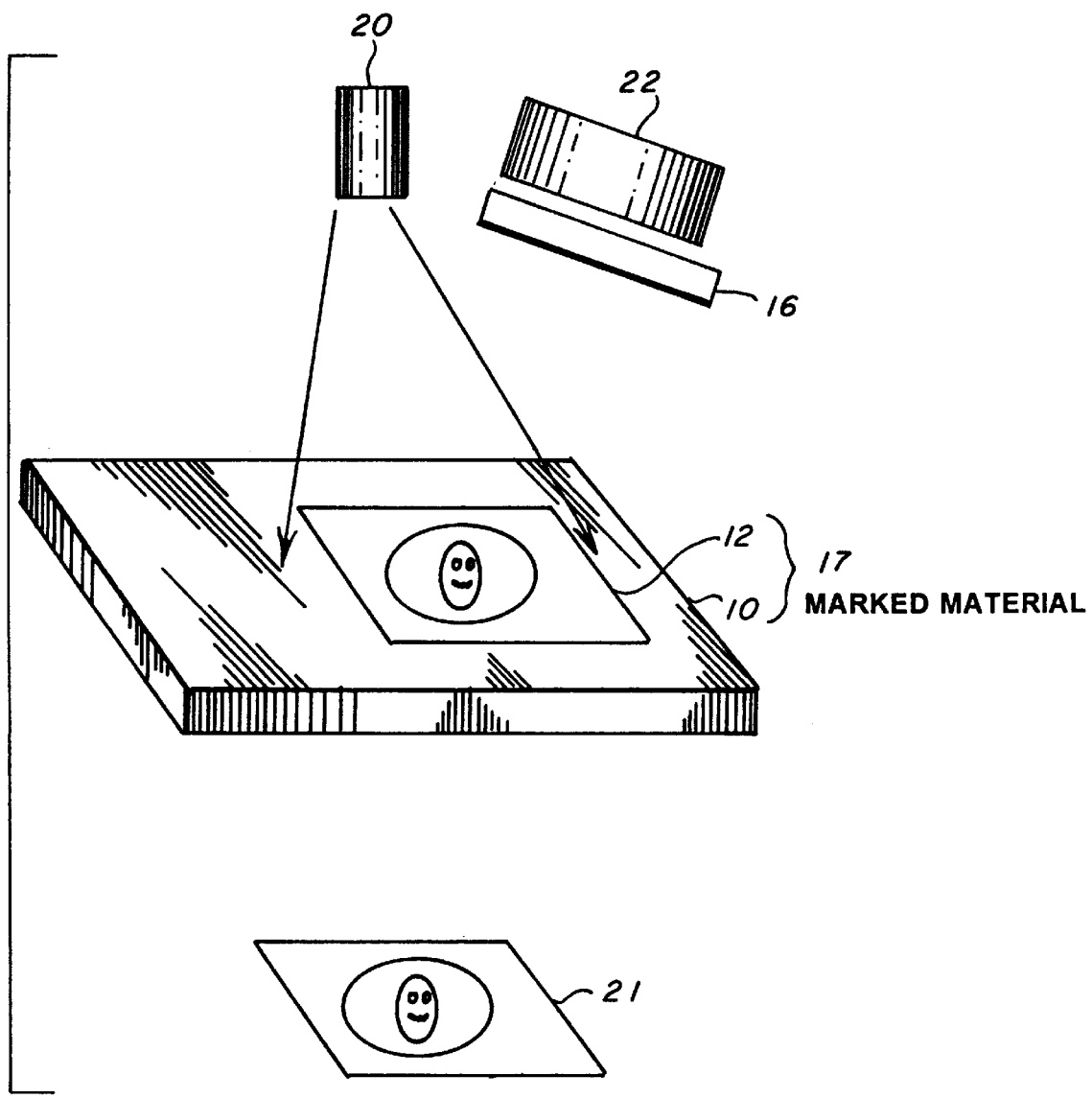
FIG. 2 is a schematic representation of an OSL readout system according to the invention.

As with excitation for prompt luminescence and trap population, whatever the morphology of the glass, the methods for exciting the glass for OSL will be the same in many cases. Referring to FIG. 2, this figure shows an IR/near-IR source 20 positioned for illuminating the patterned label 12, to stimulate OSL. To observe an OSL image, the patterned label 12 must first be energized using a short wavelength UV source to cause electrons to be trapped. The trapped electrons then may be released by exposing the patterned label 12 to an infrared light source 20. The released charges may then recombine, and thereby emit photons. The resulting optically stimulated luminescence can be viewed with an OSL detector 22, which may also be the same CCD camera used for detecting the prompt luminescence, used in the same way.

Having described the general schemes of the invention, particular applications of the invention may now be understood.

Patterned emission will be a useful feature of the invention, especially for coding applications. The invention may be used to put e.g., an alphanumeric code, bar code, trademark, symbol, logo, or other product identifier, on an article, by making this code visible upon UV stimulation for prompt luminescence and/or the code may also be made visible by near-IR/IR stimulation of the OSL. The patterns may be written by patterned application of the marking material and/or by patterned excitation of the marking material by exposure to patterned short wavelength UV light. Handheld laser scanners, similar to the ones in use for bar code reading, may be used for exposing and viewing patterned luminescence. One or two directional scanning may be used according to the invention, depending on the emission pattern.

The marking material may include a matrix of some bulk material. The OSL glass may be added to the bulk material by any suitable method, such as coating the OSL glass onto the bulk material, mixing it with the bulk material, embedding it into the bulk material, or combinations of these. A wide range of bulk materials may be used in the marking materials of the invention, including papers, polymers, glasses, fabrics, metals, ceramics, dyes, inks, stains, shellacs, varnishes, glazes, polymers, other glasses (including: borosilicate glass, aluminosilicate glass, aluminoborosilicate glass, sealing glass, soda lime glass, and other glasses possessing an annealing point less than or equal to 800 degrees Celsius) and combinations of these. Borosilicate glasses may be useful in marking materials, due to their low melting points.

The marking material may be applied in a pattern by any of the available methods for applying a glass in any of the available morphologies in a pattern. Typically, this will mean applying a glass powder in a coating (e.g., an ink) through a mask or stencil, or with an ink jet. Alternatively, if the OSL glass is incorporated into a fiber, either a glass fiber or a fiber of another material, this fiber may be woven, sewn, or otherwise applied in a pattern to an article. Advantages of patterned application include the permanence of the pattern (once the pattern is made, it will endure for essentially the life of the article it is applied to), and the simplicity of excitation (metastable traps can be formed by simply exposing the label to a flood of short wavelength UV radiation).

Patterned illumination will generally take place through a mask. Advantages of patterned illumination include the rewrite capability it entails (one can stimulate emission of all or essentially all the trapped charges, and re-excite the label in a new pattern), and the simplicity of the initial manufacture (application of the marking material in a uniform, or at least non-patterned, manner is straightforward).

Objects coated with the marking material can be patterned using the mask technique as described above, or directly patterned using a spatially controlled UV light source such as a UV laser. Alternatively, the marking material may be used as a printing ink to apply specific patterns on objects.

Another useful feature of the invention is the time scale of the phosphorescence. The glasses of the present invention will phosphoresce upon exposure to UV light. After removal of the UV excitation, this phosphorescence will decay slowly, over a time scale of seconds to tens of seconds, much longer than the rapid fadeout of the fluorescent materials of the prior art. This feature may be used to distinguish labels of the present invention from labels of the prior art.

Accordingly, an application of the present invention is to expose a label of the invention to UV light, and time the decay of the phosphorescence after the removal of the UV excitation. Comparing this fadeout to an expected fadeout will prove or disprove the presence of the OSL glasses used in the present invention. Also, two or more OSL glasses may be combined in a label, to give characteristic fadeout profiles.

The lifetime of the metastable, long-lived traps is another useful feature of the invention. As noted above, the traps of the present invention are metastable. However, the OSL glasses do not all have the same metastability. The metastable traps of different OSL glasses according to the invention will decay over different time scales ranging from days to weeks to months to years. Each of these may be determined with precision, however, and used to measure the time since excitation. Combinations of different types of glasses with different decay rates will permit additional flexibility in methodology.

The luminescent colors produced by the glasses of the invention cover a considerable range. By selecting a particular glass, or a particular combination of glasses, color coding can be provided.

The invention can be used for a wide range of articles. A few that may be particularly worth noting include: (a) security paper for bonds, stock certificates, currency, and the like; (b) articles of clothing; (c) articles with recorded information, such as computer disks and tapes, CDs, CD-ROMs, videotapes, and the like, as a source verification system; and (d) other manufactured articles.

Having described the invention, the following examples are given to illustrate specific applications of the invention, including the best mode now known to perform the invention. These specific examples are not intended to limit the scope of the invention described in this application.

EXAMPLE 1

Five grams of 325 mesh type 7930 Vycor™ powder was added to 100 ml water solution containing 0.125 g of $CuSO_4.(5H_2O)$. The mixture was allowed to stand for approximately 2 hours. The liquid was evaporated leaving behind a dry porous Vycor™ powder containing the $CuSO_4$ crystallites. The powder was placed in an alumina crucible and heated in a muffle furnace to a temperature of 1150° C. to yield a white powder glass material that exhibits bright blue-green luminescence when exposed to a 254 nm mercury light source. Exposing the activated glass powder to a mercury lamp with wavelength components at 185 nm and 254 nm causes electrons to be trapped in metastable traps that persist for periods of time ranging from hours to months. When the previously UV exposed powder is illuminated with a 790 nm light source, the powder emits a blue-green luminescence referred to as optically stimulated luminescence.

Figure 3:
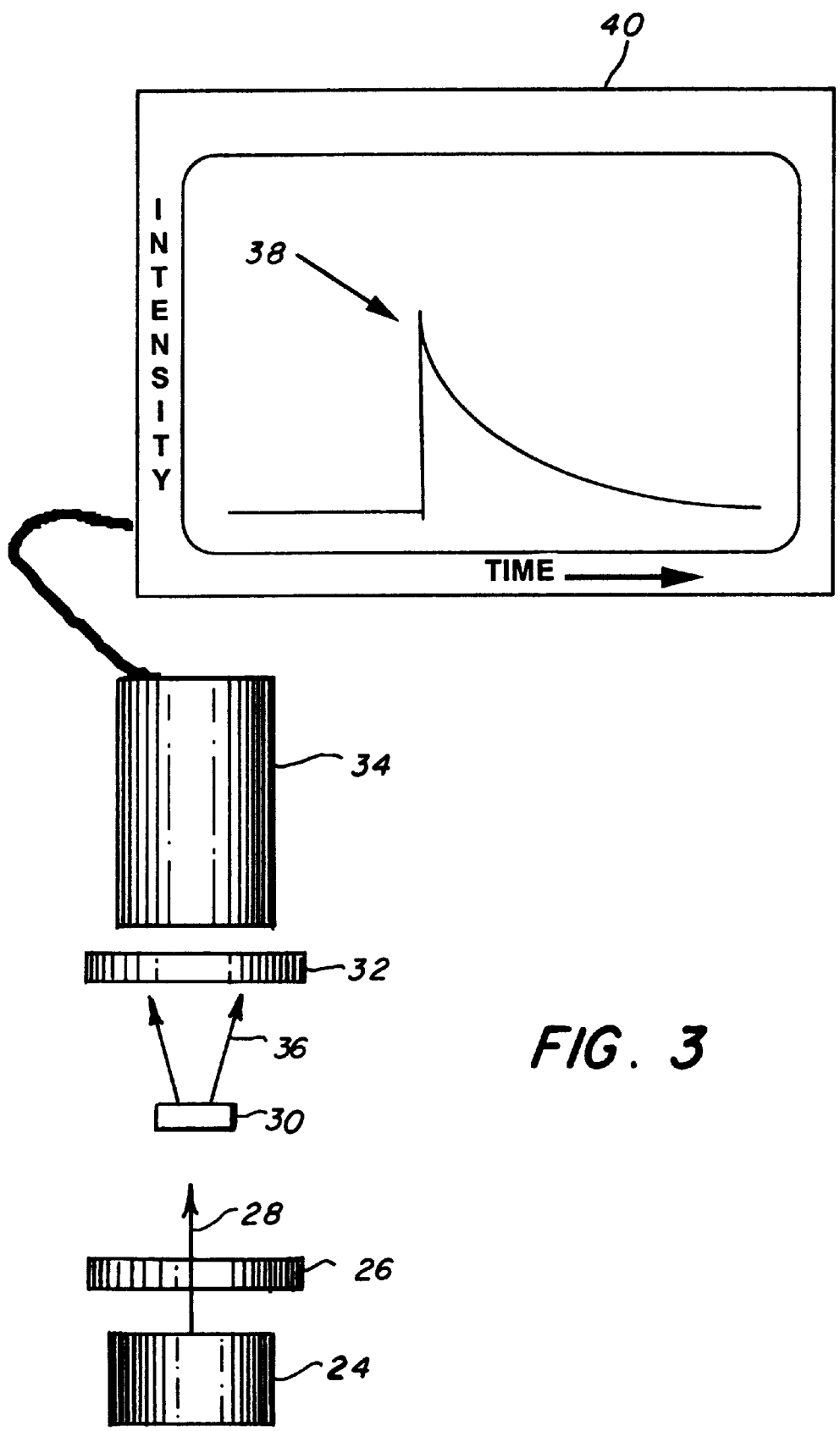
FIG. 3 is a schematic representation of an OSL readout system with a display according to the invention.

A schematic of the apparatus used to observe optically stimulated luminescence is shown in FIG. 3. The system includes a diode laser 24 that emits radiation at a wavelength of about 800 nm, a red color glass filter 26, selected to pass wavelengths greater than 780 nm and completely block wavelengths shorter than 700 nm. The sample 30 is placed directly above the red filter 26 and in the path of the laser beam 28. A second color glass filter 32, selected to pass wavelengths between 400 nm and 650 nm, is placed directly above the sample. A photomultiplier tube 34 is placed directly above the color glass filter to detect the blue-green optically stimulated signal light 36. The optically stimulated luminescence signal 38 is displayed on the monitor of a personal computer 40.

EXAMPLE 2

A marking material containing the activated glass powder prepared in Example 1 can be obtained by preparing a solution of the OSL glass powder in a polymer. This marking material may be coated onto a substrate such as glass or paper. The marking material may be applied in the form of a logo, a barcode or any other distinctive mark. Luminescence from the marking material can be observed by illuminating the marking material with an ultraviolet lamp with a wavelength below 300 nm. Exposing the marking material to UV wavelengths of 185 nm and 254 nm from a mercury lamp causes electrons in the OSL glass powder to be trapped and stored for extended periods of time. Marking material that contains trapped electrons can be identified by exposing the marking material to an infrared light source such as a 800 nm diode laser and observing the optically stimulated luminescence.

Figure 4:
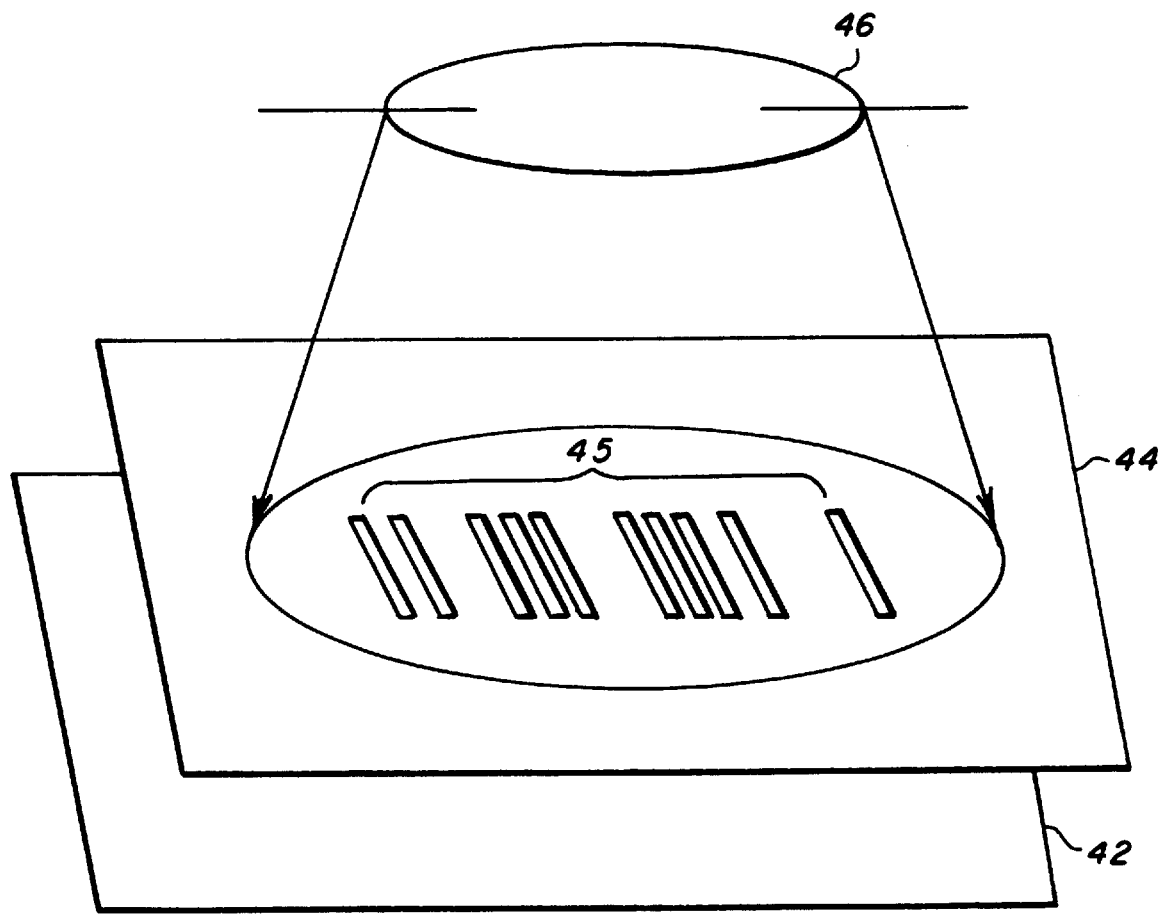
FIG. 4 is a schematic representation of a system for patterned exposure of a label according to the invention.

FIG. 4 schematically illustrates a method for preparing an invisible bar code. A glass slide 42 was painted with the marking material (powdered OSL glass in a polymer solution). A stencil or mask 44 with a bar code pattern 45 was made by cutting a series of slots in a black piece of paper. The stencil was placed on top of the labeled glass slide and exposed to a mercury lamp 46 with 185 nm and 254 nm emission for a period of 10 seconds. The labeled glass slide was allowed to sit in the dark for several hours.

EXAMPLE 3

Figure 5:
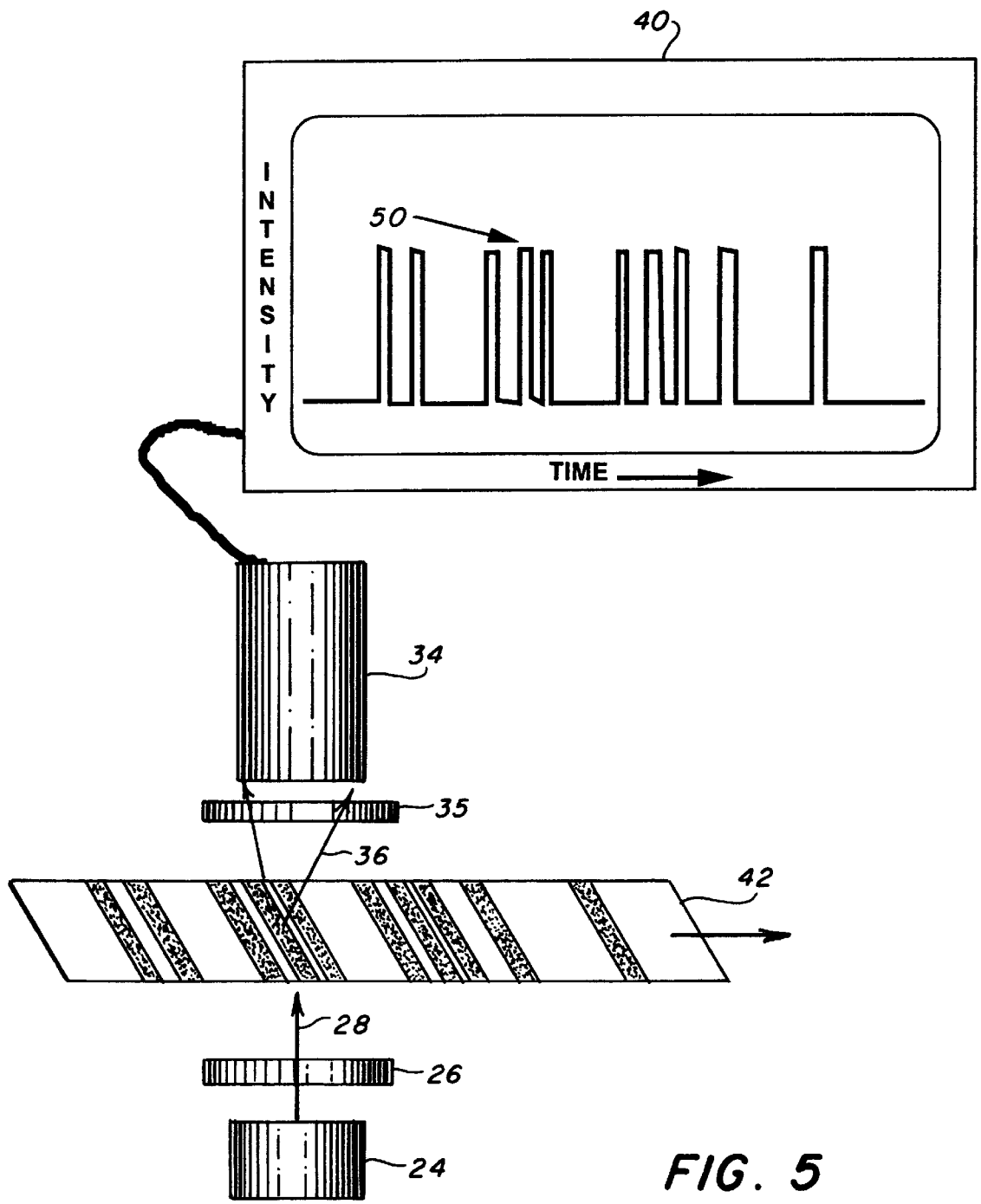
FIG. 5 is a schematic representation of a system for reading a patterned exposed label according to the invention.

FIG. 5 shows a method for reading the invisible bar code label of Example 2 (FIG. 4). The labeled glass slide 42 was placed in the OSL reader. The labeled glass slide 42 was pulled in a direction perpendicular to the direction of the light source and detector causing the UV exposed stripes to pass through the 800 nm light beam. As each activated stripe passed through the stimulation beam, OSL light was generated and detected with the PMT, and the resulting bar code signal 50 was observed on the personal computer display.

EXAMPLE 4

A broad stripe of the marking material can be painted onto a substrate and specific portions of the painted area can be exposed to the deep UV source creating a distinctive pattern that can be observed only by using the optically stimulated luminescence technique. The patterns may be in the form of a bar code, a logo or words. The patterned areas would not be distinguishable when viewed using the prompt fluorescence technique.

EXAMPLE 5

Figure 6:
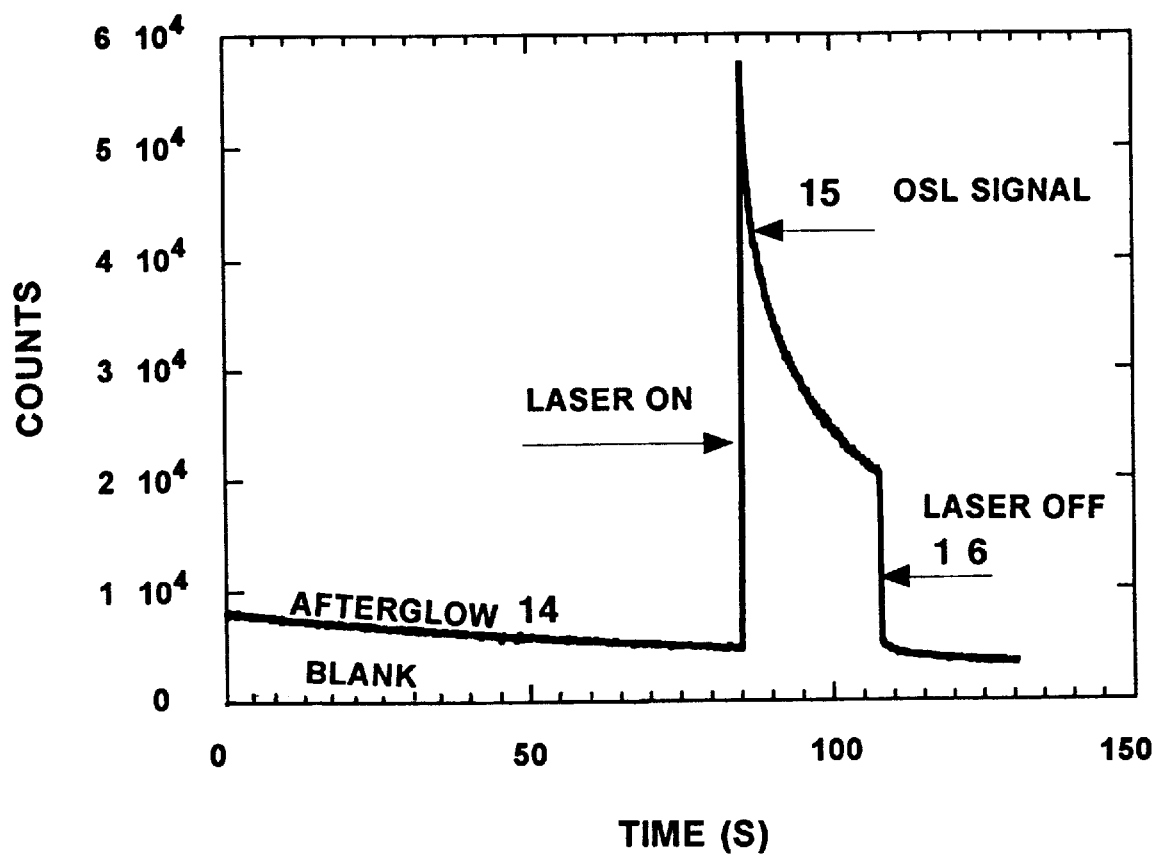
FIG. 6 is a temporal plot of the luminescence of a UV-exposed material, including an afterglow and an OSL signal according to the invention.

The temporal behavior of the phosphorescence from the OSL glass can be used to identify invisibly marked items The OSL glass prepared from various types of glasses have distinctive phosphorescence decay times. FIG. 6 illustrates the temporal behavior of the phosphorescence and the optically stimulated luminescence for a sample of copper-doped Vycor glass powder prepared as described in Example 1. The sample was exposed to the UV lamp for several seconds and immediately placed in the OSL reader of FIG. 2. A slow phosphorescence decay was observed for the first 80 seconds. At t=80 seconds, the diode laser was turned on and the OSL signal rose rapidly and then decayed relatively quickly compared to the phosphorescence decay. At t=107 seconds the laser was turned off (6) and the signal dropped back down to the original phosphorescence decay level.

Obviously, many modifications and variations of the present invention are possible in light of the above teachings. It is therefore to be understood that, within the scope of the appended claims, the invention may be practiced otherwise than as specifically described.

What is claimed is:

1. An article marked for identification, comprising:
    a luminescent label for said article, said label comprising an optically stimulable glass.

2. The article of claim 1, wherein said label comprises a glass matrix having trapping centers and luminescence centers, for providing optically stimulated luminescence.

3. The article of claim 1, wherein said label comprises an optically stimulable glass, said glass selected from the group consisting of:
    (i) a glass matrix doped with an alkaline earth sulfide, activator Sm ions, and an additional coactivator dopant selected from the group consisting of Eu ions, Ce ions, and combinations thereof, said alkaline earth sulfide and said activator and coactivator being present in amounts sufficient to provide said glass with optically stimulable luminescence;
    (ii) a glass matrix doped with ZnS and activator ions selected from the group consisting of Cu ions, Pb ions, Mn ions, Ce ions, Eu ions, Ag ions, Au ions, Fe ions, and combinations thereof, said ZnS and said activator being present in amounts sufficient to provide said glass with optically stimulable luminescence; and
    (iii) a glass matrix doped with ions selected from the group consisting of Cu ions, Eu ions, Ce ions, Ag ions, Pb ions, Fe ions, Au ions, and combinations thereof, in amounts sufficient to provide said glass with optically stimulable luminescence, wherein said matrix is essentially free of metal sulfides.

4. The article of claim 3 wherein said glass matrix is a silica, alumina, or borate glass matrix.

5. The article of claim 3, wherein said glass matrix is connected to a transparent portion of said article.

6. The article of claim 3, wherein said optically stimulable glass is disposed in a pattern.

7. The article of claim 3, wherein said optically stimulable glass is coupled to a bulk material.

8. The article of claim 7, wherein said bulk material is selected from the group consisting of papers, polymers, glasses, fabrics, metals, ceramics, and combinations thereof.

9. The article of claim 7, wherein said optically stimulable glass is coupled to said bulk material by a method selected from the group consisting of coating said optically stimulable glass onto said bulk material, mixing said optically stimulable glass with said bulk material, embedding said optically stimulable glass into said bulk material, and combinations thereof.

10. The article of claim 9, wherein said optically stimulable glass is included in a marking material selected from the group consisting of dyes, inks, stains, shellacs, varnishes, glazes, polymers, and other glasses.

11. A method for labeling an article, comprising the steps:
    providing a luminescent label for said article, coupled to said article; and
    exposing said luminescent label to a radiation flux to populate metastable trapping centers in said luminescent label.

12. The method of claim 11, wherein said luminescent label comprises an optically stimulable phosphor.

13. The method of claim 11, wherein
    said label comprises an optically stimulable glass, said glass selected from the group consisting of
    (i) a glass matrix doped with an alkaline earth sulfide, activator Sm ions, and an additional coactivator dopant selected from the group consisting of Eu ions, Ce ions, and combinations thereof, said alkaline earth sulfide and said activator and coactivator being present in amounts sufficient to provide said glass with optically stimulable luminescence;

(ii) a glass matrix doped with ZnS and activator ions selected from the group consisting of Cu ions, Pb ions, Mn ions, Eu ions, Ce ions, and combinations thereof, said ZnS and said activator being present in amounts sufficient to provide said glass with optically stimulable luminescence; and (iii) a glass matrix doped with Cu ions, Eu ions, Ce ions, Ag ions, Pb ions, Fe ions, Au ions, or combinations thereof, in amounts sufficient to provide said glass with optically stimulable luminescence.

14. The method of claim 13, wherein said radiation is ultraviolet radiation having a peak wavelength shorter than about 220 nm.

15. The method of claim 13, wherein said radiation is radiation having a peak wavelength at about the 185 nm peak for mercury.

16. The method of claim 13, wherein said radiation is radiation having a peak energy of about 4 eV.

17. The method of claim 13, wherein said radiation flux exposes said label in a pattern.

18. The method of claim 17, wherein said patterned exposure is through a mask.

19. A method for reading the label on a labeled article, comprising the step:

exposing said label to a radiation flux of optical radiation, thereby causing said label to luminesce.

20. The method of claim 19, wherein said radiation flux is optical radiation having a wavelength of at least 254 nm to stimulate prompt luminescence.

21. The method of claim 20, further comprising the step:

prior to said exposure to said optical radiation flux, exposing said label to a radiation flux to populate metastable traps in said label, and wherein said optical radiation stimulates the release of trapped charges in said label.

22. The method of claim 21, wherein said optical radiation flux is IR, near-IR, or visible light radiation.

23. The method of claim 20, further comprising the step of viewing said prompt luminescence.

24. The method of claim 23, wherein said viewing is with a photon detector or imaging device.

25. The method of claim 23, wherein said viewing is with a CCD camera or a photomultiplier tube.

26. The method of claim 23, wherein said exposing and said viewing said prompt luminescence comprises scanning said label with a scanner.

27. The method of claim 26, wherein said scanner comprises a laser.

28. The method of claim 27, wherein said laser is adapted for scanning said label in at least one direction.

29. The method of claim 27 wherein said laser is adapted for scanning said label in at least two directions.

30. The method of claim 19, wherein said optical radiation flux is ultraviolet radiation to stimulate prompt luminescence, and further comprising the step of exposing said label to a subsequent radiation flux of optical radiation to stimulate the release of trapped charges, thereby causing said label to luminesce, wherein said subsequent radiation flux is IR, near-IR, or visible light radiation.

31. The method of claim 19, wherein said label comprises at least one phosphor having a distinct emission spectrum or decay rate.

* * * * *